Nov. 24, 1925.
F. H. HAGNER
ARTICLE GUARANTY
Filed June 12, 1924
1,562,882
Fig.1.
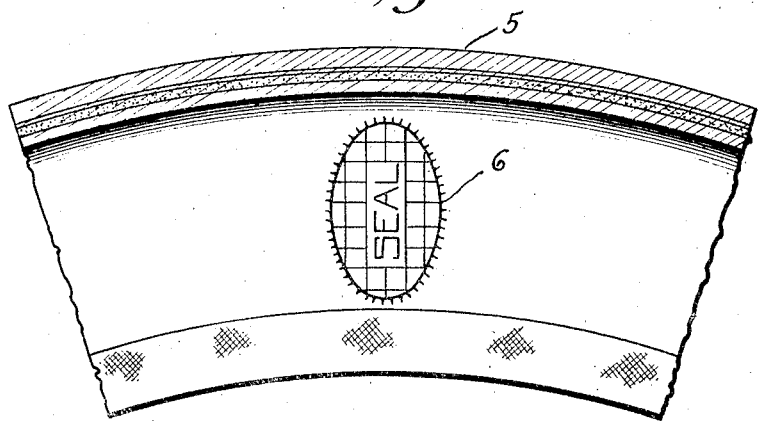
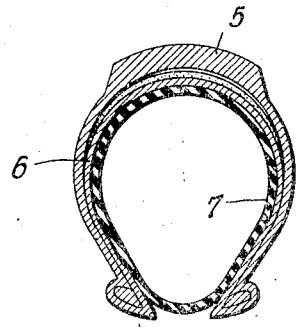
Fig.2.
Frederick H. Hagner, Inventor
Witnesses
By Richard B. Owen
Attorney Patented Nov. 24, 1925.

1,562,882

UNITED STATES PATENT OFFICE.

FREDERICK H. HAGNER, OF SAN ANTONIO, TEXAS.

ARTICLE GUARANTY.

Application filed June 12, 1924. Serial No. 719,672.

*To all whom it may concern:*

Be it known that I, FREDERICK H. HAG-NER, citizen of the United States, residing at San Antonio, in the county of Bexar and State of Texas, have invented certain new and useful Improvements in an Article Guaranty, of which the following is a specification.

The present invention relates to an article guaranty, having for its prime object to provide a process whereby indicia may be placed upon articles, guaranteeing the same, which indicia will be erased or obliterated through misuse or abuse.

The process is designed particularly for use upon tire shoes and inner tubes. For instance in the sale of tire shoes or tubes it is customary to guarantee the same for a certain mileage provided they are not abused by being run under inflated or non-inflated. Very often a customer brings in such a tire tube or shoe for adjustment which has been abused but will not acknowledge the abuse. With this process it is possible for the dealer to demonstrate clearly that the tire shoe or tube was abused and in fact the customer will not bring the casing or tube back for adjustment because his abuse thereof will cause the breaking of the contract seal or the like which may be placed on the shoe or tube.

In the accompanying drawing forming part of this specification, Figure 1 shows a fragment of a tire shoe in circumferential radial central section and having a guaranty mark placed on the inner surface of the side thereof in accordance with the present invention, and Figure 2 is a transverse radial section of the tire shoe shown in figure with an inner tube therein.

In order to clearly set forth the features of this invention I shall describe the same in conjunction with a practical example, using a tire shoe for this purpose. My process consists of placing on the inside of the tire shoe 5 a seal 6 or the like which would be obliterated or erased by friction between the contact surfaces of the shoe 5 and the inner tube 7 upon abuse of the shoe such as running the same uninflated or not properly inflated. It is customary in the manufacture of such shoes to paint them internally with soap stones and the seal or warranty may be impressed in this soap stone and from experience I have found that should the tire be run uninflated or not properly inflated such a seal or warranty would be erased.

If desired a sheet of paper or label having printed thereon the warranty may be pasted to the inside of the tire then painted over with the soap stone. Experience has taught that this paper label will be destroyed completely if the tire is run any great distance not properly inflated or entirely uninflated.

It is evident that the same process can be utilized in different ways and methods and I therefore do not care to be limited to the specific example herewith described in detail.

Having thus described my invention, what I claim as new is:

1. The process of marking tires consisting of forming indicia on the inside thereof in the soap stone coating usually found therein so that the indicia will be obliterated should the tire be run in a partially or totally uninflated position.

2. A pneumatic tire embodying a shoe containing an inner tube adapted to be inflated so that the outer surface of the tube contacts the inner surface of the shoe, and indicia on one of the contacting surfaces, said indicia being of such a nature as to be readily destroyed by friction between the contacting surfaces of the shoe and tube if the tire is run in partially or totally uninflated condition.

3. A pneumatic tire embodying a shoe containing an inner tube adapted to be inflated so that the outer surface of the tube contacts the inner surface of the shoe, and indicia on the inner surface of the shoe, said indicia being of such a nature as to be readily destroyed by friction between the contacting surfaces of the shoe and tube if the tire is run in partially or uninflated condition.

In testimony whereof I affix my signature.

FREDERICK H. HAGNER.